(12) United States Patent
Hambsch et al.

(10) Patent No.: US 6,424,055 B1
(45) Date of Patent: Jul. 23, 2002

(54) DEVICE FOR TRANSMITTING SIGNALS TO ONE OR MORE CIRCUITS INTEGRATED INTO THE HEAD REST OF A MOTOR VEHICLE SEAT

(75) Inventors: Katja Hambsch, Bretten; Joachim Bauer, Oberstenfeld-Prevorst, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/581,491

(22) Filed: Oct. 23, 2000

(30) Foreign Application Priority Data

Oct. 14, 1998 (DE) .......................................... 198 47 302

(51) Int. Cl.[7] .............................................. B60R 11/02
(52) U.S. Cl. ...................................... 307/10.1; 280/735
(58) Field of Search ................................. 297/464, 410; 307/10.1, 9.1; 180/272; 280/735

(56) References Cited

U.S. PATENT DOCUMENTS

| 5,683,103 | A | | 11/1997 | Blackburn et al. | |
| 5,748,473 | A | | 5/1998 | Breed et al. | |
| 6,008,547 | A | * | 12/1999 | Dobler et al. | ............... 307/10.1 |
| 6,084,314 | A | * | 7/2000 | McCurdy | ................... 307/10.1 |
| 6,088,640 | A | * | 7/2000 | Breed | .......................... 280/735 |
| 6,199,900 | B1 | * | 3/2001 | Zeigler | ..................... 280/730.2 |
| 6,217,118 | B1 | * | 4/2001 | Heilig | ......................... 297/410 |

FOREIGN PATENT DOCUMENTS

| DE | 39 25 995 | | 2/1991 |
| DE | 195 12 855 | * | 10/1996 |
| DE | 196 51 670 | | 2/1998 |
| DE | 297 19 937 U1 | * | 11/1998 |
| JP | 03286713 A | * | 12/1991 |

* cited by examiner

Primary Examiner—Josie Ballato
Assistant Examiner—Roberto Rios
(74) Attorney, Agent, or Firm—Kenyon & Kenyon

(57) ABSTRACT

A device that is easy to assemble and not subject to wear has an induction coil in the seat back of the motor vehicle seat. This induction coil is inductively coupled to the guide rod of the head restraint that is movably supported in the seat back.

11 Claims, 2 Drawing Sheets

DEVICE FOR TRANSMITTING SIGNALS TO ONE OR MORE CIRCUITS INTEGRATED INTO THE HEAD REST OF A MOTOR VEHICLE SEAT

BACKGROUND INFORMATION

The present invention relates to a device for transmitting signals to one or a plurality of circuit modules integrated in a head restraint of a motor vehicle seat.

In order to further improve the protection afforded motor vehicle passengers in the event of accidents, the restraint systems in motor vehicles are becoming more and more complex. Among the expressions of this is the fact that in the head restraints of motor vehicle seats airbags are installed that are specially designed to offer protection in the head and neck area of vehicle passengers. Along with the airbags, the driver stages required for triggering them (a firing element having control electronics) need to be integrated in the head restraints. These driver stages are usually driven from a central control unit in the vehicle. Between the control unit and the driver stage integrated in a head restraint, signals are transmitted in both directions. For example, in the event of a collision, a triggering signal is transmitted from the control unit to the driver stage, or diagnostic signals of the driver stage, which must constantly be monitored for its performance reliability, are conveyed to the control unit. If the driver stage contains circuit modules that must be supplied with current, the necessary energy must also be transmitted from the control unit to the driver stage. Similarly, in a head restraint it is possible to integrate a sensor which performs a seat occupancy detection using ultrasound or optical or electromagnetic waves.

Since the head restraint is a movable part and therefore the circuit modules integrated in it do not have a constantly fixed position with respect to the control unit, the signal transmissions are not carried out using fixed conductor connections. Therefore, the present invention is based on the objective of indicating a device for transmitting signals to one or a plurality of circuit modules integrated in the head restraint of a motor vehicle seat, circuit modules that can operate without transmission means that are subject to wear.

SUMMARY OF THE INVENTION

The aforementioned objective is achieved through the fact that the signal transmission takes place via at least one induction coil arranged in the seat back of the vehicle seat and via one or both head restraint guide rod/rods, which are interactively coupled to the at least one coil and are movably supported in the seat back. This device represents a contact-free signal connection to one or a plurality of circuit modules in a head restraint, sliding-action contacts or cable connections, both subject to wear, not being necessary. As a result of the fact that the guide rods of the head restraint are integrated into the signal transmission, the expense for the transmission device is significantly reduced. The device is composed of a small number of separate parts, which makes assembly easier.

According of the present invention proceed from the subclaims. According to them, at least one of the two guide rods can be wrapped around by a secondary coil, which, along with the at least one primary coil in the seat back, constitutes a transmitter (repeating coil), the secondary coil being wound on the guide rod so as to be distributed over a length, such that in every position of the head restraint an inductive coupling exists between the coils. The secondary coil on the guide rod is advantageously surrounded by an insulating sleeve. The primary coil coaxially surrounds the guide rod carrying the secondary coil and rests in a ring core having a U-shaped cross-section, which concentrates the magnetic flux on the secondary coil.

In a further advantageous embodiment, the two guide rods are electrically connected to each other at their ends in the head restraint and in the seat back, so that as a result a conductor loop arises, in which a current is induced as a result of the at least one coil arranged in the seat back. In the head restraint, elements are provided by which the induced current can be decoupled from the conductor loop. These elements, for example, can be composed of a resistor inserted into the conductor loop or a coil coupled to the conductor loop.

In accordance with a further advantageous exemplary embodiment, the two guide rods are made of a ferromagnetic material, and they are joined to make a magnetic circuit by ferromagnetic connecting pieces present in the head restraint and in the seat back. In the head restraint, a winding is present which is coupled to the magnetic circuit.

A circuit module integrated in the head restraint, for example, can be a driver stage or a seat-occupancy sensor.

DETAILED DESCRIPTION

Figure 1:
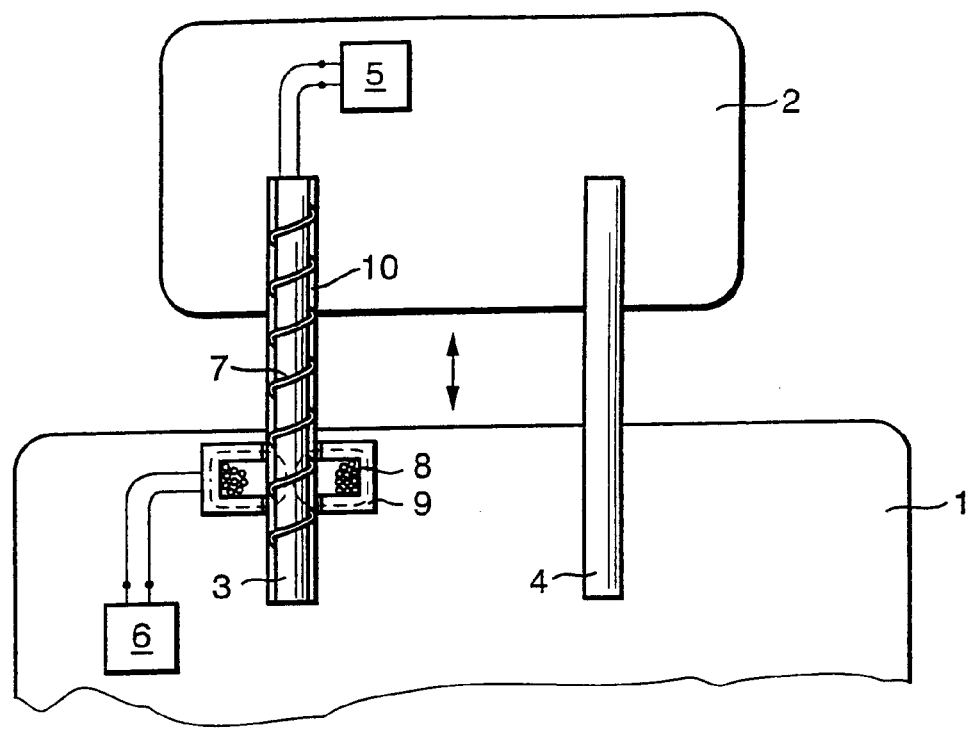
FIG. 1 depicts a signal transmission device having a primary coil in the seat back and a secondary coil wound on a guide rod of the head restraint.

In FIGS. 1 through 4, a seat back 1 is schematically depicted of a motor vehicle seat having a head restraint 2, the head restraint being supported by guide rods 3 and 4 in seat back 1 so as to be adjustable in height. In head restraint 2, a circuit module 5 is integrated, which, for example, can be a driver stage for an airbag or a seat-occupancy sensor or another circuit that can advantageously be integrated in head restraint 2. Of course, more than one circuit module can be accommodated in head restraint 2.

Between circuit module 5 in head restraint 2 and a circuit arrangement 6 (for example, a control unit) arranged on the side of seat back 1 (or at another location in the vehicle), a signal transmission is designed to be possible without a direct connection between both circuits 5 in 6. In FIGS. 1 through 4, different variants are depicted for a signal transmission device of this type.

In accordance with the exemplary embodiment depicted in FIG. 1, guide rod 3 of head restraint 2 is wrapped around by a coil 7, whose outputs are connected to circuit module 5 in head restraint 2. This coil 7 represents the secondary winding for a transmitter, whose primary winding 8 is arranged in seat back 1 and coaxially surrounds guide rod 3, that is wound in secondary winding 7. Circuit arrangement 6 in seat back 1 is connected to the outputs of primary coil 8. Advantageously, primary coil 8 rests in a U-shaped ring core 9. The cross-section of ring core 9, depicted in FIG. 1, clearly shows the core's U-shape. Using the ring core, formed in this way and made of ferromagnetic material, the magnetic field, whose flow is indicated by the dotted lines, is concentrated on ring core 9 and secondary coil 7 on guide rod 3, avoiding field dispersions. Guide rod 3, having secondary coil 7 wound on it, can move back and forth through ring core 9 without contacting it. To insure an inductive coupling between primary coil 8 and secondary coil 7 in every position of head restraint 2, secondary coil 7 is wound on guide rod 3 over an area of appropriate length.

In contrast to the exemplary embodiment depicted in FIG. 1, it is also possible to inductively couple a plurality of primary coils with secondary coil 7, in order to transmit signals of various types to various circuit modules in head restraint 2. The variety of the signals can be reflected in differing frequencies or amplitudes. Second guide rod 4, in the same manner as guide rod 3, can also be used for signal transmission. This signal transmission can either be redundant with respect to the signal transmission via guide rod 3, or it can be provided for further circuit modules in head restraint 2.

For purposes of mechanical protection and electrical insulation, a plastic sleeve 10 is slid over secondary coil 7 on guide rod 3, or secondary coil 7 is cast in sleeve 10.

Figure 2:
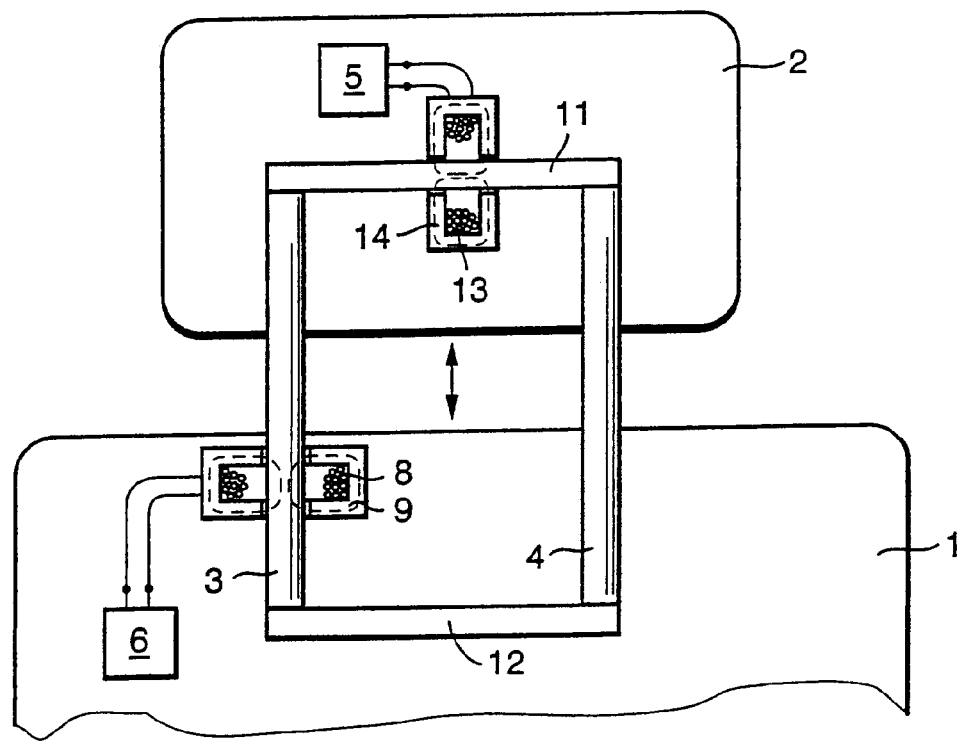
FIG. 2 depicts a signal transmission device having a first coil in the seat back and a second coil in the head restraint, both of which being coupled to a magnetic circuit formed by one of the guide rods of the head restraint.

In accordance with the exemplary embodiment depicted in FIG. 2, both guide rods 3 and 4 of head restraint 2 are made of a ferromagnetic material. In head restraint 2 and in seat back 1, guide rods 3 and 4 are joined in a magnetic circuit by connecting rods 11 and 12, which are also made of ferromagnetic material. In seat back 1, magnetic circuit 3, 4, 11, 12 is coupled to a first coil 8, which, as already described in connection with FIG. 1, rests in a ring core 9 having a U-shaped cross-section. Ring core 9 having coil 8 surrounds the guide rod 3, which is movably supported. Arranged in head restraint 2 is a second coil 13, which also rests in a ring core 14 having a U-shaped cross-section. Second coil 13 in ring core 14, the coil being connected to circuit module 5, surrounds connecting piece 11, but can also be arranged so as to wind around guide rod 3 or 4. Via the magnetic circuit composed of guide rods 3, 4 and connecting pieces 11, 12, both coils 8 and 13 are inductively coupled, as a result of which a signal transmission is possible between circuits 6 and 5.

Figure 3:
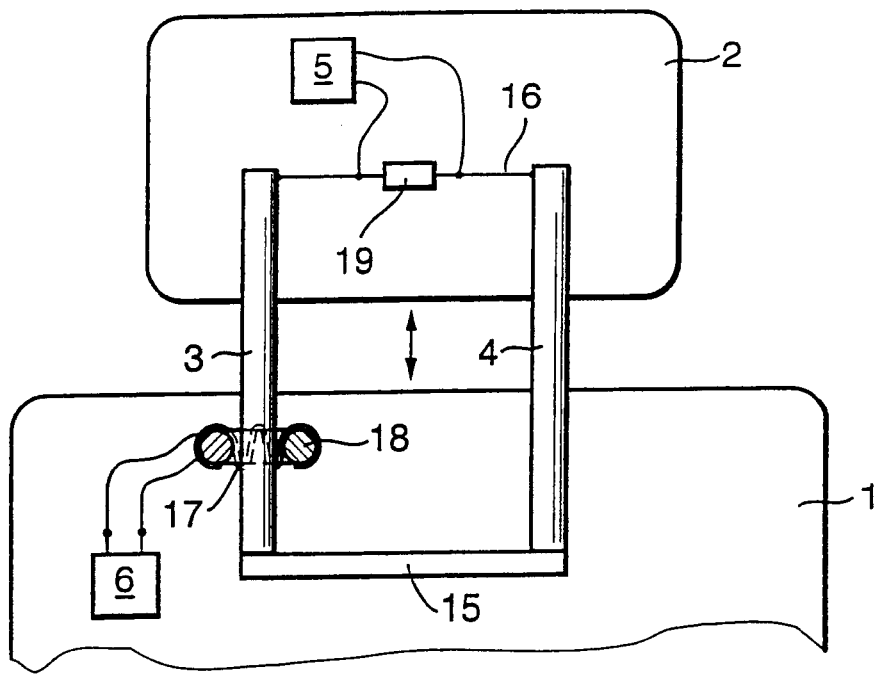
FIG. 3 depicts a signal transmission device having a coil in the seat back, the coil being inductively coupled to a conductor loop formed from the guide rods of the head restraint.

In the exemplary embodiment depicted in FIG. 3, electrically conductive guide rods 3 and 4 of head restraint 2 are joined into a conductor loop using connections 15 and 16 in seat back 1 and in head restraint 2. In seat back 1, guide rod 3 is surrounded by a first coil 17, connected to circuit arrangement 6 in seat back 1. Coil 17 is wound on a core 18 configured as a toroid, the core surrounding guide rod 3. As a result of this type of winding of coil 7, a magnetic field arises that revolves in circular fashion around guide rod 3, as a result of which, a current flows in the conductor loop, composed of guide rods 3 and 4 and connections 15 and 16. The current induced in the conductor loop can be tapped off via a resistor 19, which is inserted into connecting conductor 16 in head restraint 2, and it can be fed to circuit module 5. Similarly, a signal can be applied to resistor 19 from circuit arrangement 5 to the conductor loop, as a result of which a current flows through the conductor loop, which in turn induces a current in the coil 17. Thus a transmission is possible from circuit arrangement 6 in seat back 1 to circuit 5 in head restraint 2, and vice versa.

Figure 4:
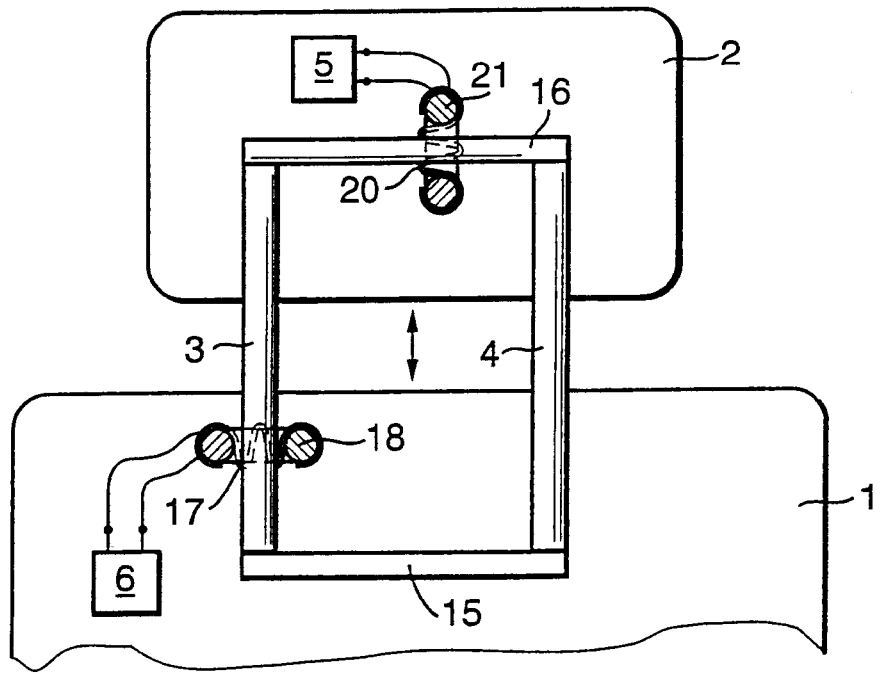
FIG. 4 depicts the transmission device having a first coil in the seat back and a second coil in the head restraint, both of which being inductively coupled to a conductor loop formed from the guide rods of the head restraint.

As FIG. 4 shows, in place of resistor 19, a second coil 20 can be coupled to conductor loop 3, 4, 15, 16. Second coil 20, which is connected to circuit arrangement 5 in head restraint 2, like coil 17 in seat back 1, is also wound on a toroid-shaped core 21, which coaxially surrounds connecting conductor 16 of the conductor loop (or, in place thereof, guide rod 3 or 4). Thus a coupling arises across the conductor loop between two coils 17 and 20, as a result of which a signal transmission is possible in both directions between circuits 5 and 6.

What is claimed is:

1. A device for performing a transmission of a signal to at least one circuit device integrated in a head restraint of a motor vehicle seat, comprising:
    at least one induction coil through which the signal transmission occurs and being arranged in a seat back of the vehicle seat; and
    at least one guide rod arranged with respect to the head restraint and through which the signal transmission occurs, the at least one guide rod being movably supported in the seat back and being inductively coupled to the at least one induction coil.

2. The device according to claim 1, further comprising:
    a secondary coil, wherein:
    the at least one guide rod includes a first guide rod and a second guide rod,
    at least one of the first guide rod and the second guide rod is wrapped around by the secondary coil,
    the secondary coil and the at least one induction coil form a transmitter, and
    the secondary coil is wound on one of the first guide rod and the second guide rod so as to be distributed over a length such that an inductive coupling between the at least one induction coil and the secondary coil arises in every position of the head restraint.

3. The device according to claim 2, further comprising:
    an insulating sleeve surrounding the secondary coil on the one of the first guide rod and the second guide rod.

4. The device according to claim 2, wherein:
    the at least one induction coil coaxially surrounds the one of the first guide rod and the second guide rod bearing the secondary coil.

5. The device according to claim 4, further comprising:
    a ring core having a U-shaped cross-section and within which the at least one induction coil rests.

6. The device according to claim 2, wherein:
    the first guide rod and the second guide rod are electrically connected to each other to form a conductor loop in which a current is capable of being induced by the at least one induction coil, and
    the device further comprises an arrangement by which the induced current is capable of being decoupled from the conductor loop.

7. The device according to claim 6, wherein:
    the arrangement includes a resistor inserted into the conductor loop.

8. The device according to claim 6, wherein:
    the arrangement includes a coil coupled to the conductor loop.

9. The device according to claim 1, further comprising:
    a magnetic circuit;
    a plurality of ferromagnetic pieces arranged in the head restraint and in the seat back; and another coil arranged in the head restraint and coupled to the magnetic circuit, wherein:

the at least one guide rod includes a first guide rod and a second guide rod, each one of the first guide rod and the second guide rod includes a ferromagnetic material, and the first guide rod and the second guide rod are joined to the magnetic circuit by the plurality of ferromagnetic pieces.

10. The device according to claim 1, further comprising:

a circuit module arranged in the head restraint and corresponding to a driver stage for an airbag.

11. The device according to claim 10, wherein:

the circuit module corresponds to a seat-occupancy sensor.

* * * * *

UNITED STATES PATENT AND TRADEMARK OFFICE
CERTIFICATE OF CORRECTION

PATENT NO.   : 6,424,055 B1  Page 1 of 1
DATED        : July 23, 2002
INVENTOR(S)  : Katja Hambsch et al.

It is certified that error appears in the above-identified patent and that said Letters Patent is hereby corrected as shown below:

Column 1,
Lines 59 and 60, change "According of the present invention proceed from the subclaims. According to them," to -- According to the present invention, --

Signed and Sealed this

Twentieth Day of April, 2004

JON W. DUDAS
*Acting Director of the United States Patent and Trademark Office*